United States Patent Office 3,427,183
Patented Feb. 11, 1969

3,427,183
METHOD FOR BONDING NATURAL OR SYNTHETIC TEXTILE FIBERS TO OLEFIN COPOLYMERS
Augusto Portolani, Enzo Di Giulio, and Mario Milano, Ferrara, Italy, assignors to Montecatini Edison S.p.A., Milan, Italy, a corporation of Italy
No Drawing. Filed Apr. 13, 1965, Ser. No. 447,891
Claims priority, application Italy, Apr. 14, 1964, 8,132/64
U.S. Cl. 117—76    16 Claims
Int. Cl. D06m 15/28, 15/46

ABSTRACT OF THE DISCLOSURE

Improved process for bonding fibers to saturated elastomeric ethylene/higher alhpa-olefin copolymer comprising coating fiber with a single aqueous dispersion of phenol/formaldehyde resin and latex of modified ethylene/higher alpha-olefin copolymer having from about 1 to 10% maleic acid grafted thereon, latex further containing mixture of a nonionic surfactant and an anionic surfactant, the aqueous dispersion having been allowed to mature for from about 40 to 120 hours after preparation; after coating fiber with aqueous dispersion, coated fiber is dried and elastomeric ethylene/higher alpha-olefin copolymer composition containing vulcanizing agents is contacted with coated fiber and vulcanized by heating.

---

The present invention relates a process for the adhesive bonding of elastomeric copolymers of ethyelene with an alpha-olefin to natural or synthetic fibers, and to the shaped articles obtained thereby. More particularly, it relates to a process for obtaining the adhesion of elastomeric, saturated, amorphous copolymers of ethylene with an alpha-olefin, such as propylene or butene-1 to fibers, fabrics, yarns, cords and other manufactured textile articles made of cotton, nylon, polyesters and cellulose fibers, by treatment thereof with an admixture of a latex based on a chemically modified ethylene-alpha-olefin, such as ethylene-propylene copolymer, and of a phenol resin, followed by vulcanization.

In the preparation of articles consisting of a rubbery layer and a substrate consisting of textile fibers, obtaining an adhesion which is particularly strong, under even the most drastic heating conditions, is very important.

These characteristics are particularly important, for example, in the manufacture of tires, conveyor belts, driving belts, rubber-coated fabrics and other similar manufacture articles.

Elastomeric synthetic products consisting of saturated amorphous copolymers of ethylene with higher alpha-olefins, more particularly of ethylene with propylene, are already known. These are produced with the aid of catalytic systems having an anionic coordination mechanism, consisting of organo metallic compounds and transition metal compounds. These copolymers are characterized by a completely amorphous structure, which is free from unsaturation and from substituent groups having a polar character. This makes it necessary to use organic percompounds as vulcanizing agents for cross-linking, and confers upon the vulcanizates excellent characteristics of resistance to ageing, to oxidation and to chemical agents.

However, the absence of reactive points or polar groups in the macromolecule makes the adhesion of these copolymers to other types of rubbers, particularly the unsaturated rubbers, and to natural and synthetic textile fibers extremely difficult.

Previously the problem of adhesion between copolymers of ethylene with alpha-olefins and textile fibers was solved by using, for the treatment of the fibers, a solution in organic solvents of an ethylene-propylene copolymer that had been chlorosulfonated. Due to the polar character of the chlorosulfonic substituents introduced into the macromolecules, it could then adhere to the fiber, particularly if it was treated with the conventional phenol-formaldehyde resins, while maintaining at the same time the possibility of being covulcanized with the untreated copolymer, containing no polar groups.

The adhesive methods employing more or less volatile solvents involve various difficulties due principally to the inflammability of the medium, and to the danger of formation of explosive mixtures of vapors thereof with air. Therefore, in the technique of coating fabrics with rubber, it is generally preferred to work with aqueous mixtures.

The use of a latex is particularly suitable for this purpose since it is perfectly miscible and compatible with the solutions of phenol-formaldehyde resins conventionally used for the pretreatment of textile fibers which are generally incorporated in the latex itself.

In the case of natural rubber, and of snythetic rubbers obtained in the form of an aqueous latex, no particular problem or difficulty arises.

However, in the case of synthetic non-deinic rubbers, more particularly of olefin copolymers, the preparation of latex often involves many difficulties caused by the apolar character of the macromolecules; and the simple admixing, even when very thorough, of the solution therefore with aqueous solutions of surface active agents followed by the removal of the solvent, yields emulsions with reduced stability.

Previously, the adhesion of ethylene-alpha-olefin copolymers to a natural or synthetic textile fiber was carried out by a preliminary treatment of the fiber with a stable aqueous latex (to which an aqueous solution of a phenol-formaldehyde resin was added) of a chlorosulfonated ethylene-alpha-olefin copolymer obtained by mixing while stirring a hydrocarbon solution of the chlorosulfonated olefin copolymer with water in the presence of an admixture of a non-ionic surface active agent and of an anionic surface active agent, followed by removal of the solvent.

This method gives good results but requires the preparation of a chlorosulfonated copolymer, i.e. a reaction between the olefin copolymer and chlorosulfonating agents such as $SO_2Cl$, mixtures of $SO_2$ and $Cl_2$ or chlorosulfonic acid, i.e. corrosive and volatile agents that can cause damage to the apparatus and the working area.

The object of this inveniton is a process which makes it possible to obtain the adhesion of ethylene-alpha-olefin copolymers to natural or synthetic fibers by using aqueous latexes that do not contain chlorosulfonated copolymers, but have adhesive characteristics which are at least as good.

It has now been found that adhesive bonding between an olefinic copolymer and a textile fiber can be obtained by pretreating the fiber with an aqueous dispersion of a phenol-formaldehyde resin admixed with a latex prepared from an ethylene-alpha-olefin copolymer which is chemically modified by a simple process of grafting in the presence of a non-ionic surfactant and an anionic surfactant. The grafting is carried out in an inner mixer at 200° C. with maleic acid or anhydride in the presence of small amounts of an organic peroxide.

This latex can be obtained for example by intimately mixing a solution in an organic solvent of the copolymer grafted with maleic acid, with an aqueous solution of surface active agents (emulsifies), and by the subsequent removal by distillation of the solvent and of a portion of the water, until the desired concentration of solids into the latex is attained.

This invention therefore relates to a process for bonding saturated, amorphous copolymers of ethylene with a higher alpha-olefin, more particularly with propylene or butene-1, onto natural or synthetic fibers by a preliminary treatment of said fibers with an aqueous dispersion of a phenol-formaldehyde resin and of an aqueous latex of an ethylene-alpha-olefin copolymer, more particularly ethylene-propylene or ethylene-butene-1 copolymer, grafted with maleic acid and containing a mixture of a non-ionic surfactant and an anionic surfactant, after a maturing of 40–120 hours of said resin-latex dispersion, then applying onto the thus pre-treated fiber a layer consisting of a mix containing an ethylene-alpha-olefin copolymer, vulcanization agents and a reinforcing filler, and finally vulcanizing the whole by heating at 100–230° C. The adhesion obtained with the aid of this admixture is particularly stable to heat.

The latexes of copolymer onto which maletic acid is grafted, and that are used according to this invention, are obtained by mixing, with agitation a hydrocarbon solution containing 1–30% by weight of the grafted copolymer with a solution, in the same volume of water, of a mixture of a non-ionic surfactant and an anionic surfactant.

Particularly good results have been obtained by using a mixture of a non-ionic surfactant selected from the group consisting of polyoxyethylated alkylphenols and polyoxyethylated alcohols, and of an anionic surfactant selected from the group consisting of sodium lauryl sulphate, the sodium salts of the sulfates of polyoxyethylated phenols and sodium or potassium oleates, palmitates and stearates.

The polyoxyethylated and alkylphenols are the condensation products of 6–10 mols of ethylene oxide with 1 mole of alkylphenol having an aliphatic chain containing from 6 to 10 carbon atoms, such as octyl or nonyl phenol that are commercially available for example under the names of Triton X–100, Triton X–45 and Igepal CO–430.

The polyoxyethylated alcohols are of the type

$$R(OCHR'CHR')_n OH$$

in which R is an alkyl group, R' is hydrogen or an alkyl group and $n$ is an integer between 4 and 10, such as the commercial products of the Pluronic series, for example, Pluronic F–68.

The non-ionic and anionic surface-active agents are used together in amounts from 15 to 50 parts by weight per 100 parts of grafted copolymer.

The emulsion is prepared at room temperature and, in some instances, a creaming agent such as carboxymethylcellulose is added. The enriched emulsion is freed from the solvent, in general by distillation in a current of overheated steam, and the emulsion is further concentrated up to a final solid content of 20–40%.

The aqueous solutions that are admixed with the latex of the copolymer on which maleic acid is grafted are those known for the pre-treatment of the textile fibers to be rubber-coated and consist of water, a polyvalent phenol such as resorcinol, formaldehyde and an alkali hydroxide, which are permitted to react up to formation of an aqueous suspension of phenol-formaldehyde resin. The formaldehyde/resorcinol molar ratio can vary from 1.5:1 to 10:1.

Particularly important for obtaining good final results is the maturing time of the resin in the presence of the latex. It has been found that, in order to obtain better values of adhesion, especially under heat, between the fibers treated with the suspension and the copolymer, the suspension should be matured for 40 to 120 hours.

The fibers or fabrics are treated with the final suspension in a conventional member, for example, by immersion, spreading, friction, etc. and the treated fibers are then dried under an air current until constant weight is reached. The fiber thus treated is, after drying, made to adhere to the copolymer mix, which contains the vulcanizing agents consisting of organic peroxides and of free radical acceptors, such as for example, sulfur, and possibly fillers and additives, by vulcanizing at temperatures between 100° and 230° C., preferably between 140 and 180° C., according to the usual procedures.

The ethylene/higher alpha-olefin copolymer used in the process of this invention is obtained by copolymerization of the monomers in the presence of catalytic systems which are soluble or dispersed in hydrocarbons, consisting of a transition metal compound ($VCl_4$, $VOCl_3$, vanadium triacetylacetonate, etc.) and of an organometallic aluminum compound ($AlEt_3$, $Al(is\ Bu)_3$, $AlEt_2Cl$, etc.); preferably an ethylene-propylene or ethylene-butene-1 copolymer having an ethylene content from 20 to 80% by mols and a molecular weight between 60,000 and 800,000, more particularly between 80,000 and 500,000 is employed.

The ethylene-propylene or ethylene-butene-1 copolymer which is modified by grafting, and is then used for the preparation of the latex in accordance with this invention, is obtained from the above described copolymer by grafting with maleic acid or anhydride, the grafting being carried out in the presence of small amounts, between 0.2 and 1.5% by weight, of an organic peroxide in an inner mixer, with a thermal-mechanical treatment at a temperature between 150 and 200° C., preferably at 180° C. for times from 5 to 30 minutes, preferably for 10 minutes. The modified copolymers of ethylene with propylene or butene-1 contain from 1 to 10% of maleic acid.

The organic peroxide is used in amounts between 0.1 and 10 parts by weight per 100 parts of copolymer and sulfur is used in amounts lower than 50% by weight of the peroxide amount used.

The following examples illustrate the present invention without limiting its scope.

Example 1

The grafting of the ethylene-propylene copolymer with maleic acid is carried out by a thermal-mechanical treatment in an inner mixer at 200° C. for 10 minutes; the mix has the following composition:

| | Parts by weight |
|---|---|
| Ethylene-propylene copolymer (55% by mol of ethylene) ML(1+4) 100° C.=20 | 100 |
| Di(tert. butylperoxide) tetrachlorinated | 1 |
| Maleic acid | 3 |

The final Mooney viscosity of the grafted mix has a value ML=32.5.

For the preparation of the latex, 30 parts of the grafted copolymer are dissolved in 1000 parts of heptane and the solution is then poured while stirring into 1000 parts of water containing 10 parts of Triton X–100 (polyoxyethylated isooctylphenol) and 1 part of sodium lauryl sulphate. When the emulsifying has taken place, 1 g. of carboxymethylcellulose is added, and after standing for 24 hours, it is skimmed and distilled at normal pressure until heptane is removed and up to a concentration of 30% by weight of solid in the latex. 100 g. of the latex thus obtained are then added to an aqueous solution having the following composition:

| | Parts by weight |
|---|---|
| Water | 100 |
| Resorcinol | 11 |
| Formaldehyde solution (at 35%) | 17 |
| Sodium hydroxide (at 30%) | 1 | that was previously matured for one hour.

The so obtained mixture is then permitted to mature for varying time periods and is then used for the spreading of a square rayon fabric (diameter of the yarn=0.65 mm.; number of cord per cm.=12); this fabric, after drying, is then made to adhere to a mix based on olefin copolymer having the following composition:

| | Parts by weight |
|---|---|
| Ethylene-propylene copolymer (55% by mols of ethylene) ML(1+4) 100° C.=35 | 100 |
| ISAF carbon black | 50 |
| Sulphur | 0.3 |
| Alpha,alpha'-bis(tert. butyl-peroxy) di-isopropyl benzene | 1.65 |

Vulcanization: 40 minutes at 165° C.

In the following Table I are given the data relating to adhesion between olefin copolymer and square rayon fabric for the manufacturing of tapes in relationship to traction temperature and to maturing times of the mixtures used for the pre-treatment of the fibers.

The values of adhesion were determined by peeling tests according to the method of ASTM D-413/39.

TABLE 1

| Maturing time of resin-latex admixtures (hours) | Adhesion in kg./cm. at— | | |
|---|---|---|---|
| | 25° C. | 70° C. | 90° C. |
| 0 | 1.5 | 1.0 | 1.0 |
| 24 | 3.5 | 3.1 | 2.0 |
| 48 | 4.0 | 2.6 | 2.2 |
| 72 | 5.5 | 2.2 | 2.0 |

Example 2

The grafting of ethylene-propylene copolymer with maleic acid is carried out by a thermal-mechanical treatment in an inner mixer for 10 minutes at 200° C. The mix put into the mixer has the following composition:

| | Parts by weight |
|---|---|
| Ethylene-propylene copolymer (55% by mol of ethylene) ML(1+4) 100° C.=28 | 100 |
| Di(tert. butylperoxide)tetrachlorinated | 1 |
| Maleic acid | 9 |

The Mooney viscosity of the grafted mix has a value ML=78.

10 parts of modified copolymer are dissolved in 1000 parts of heptane, the solution is then poured while stirring into 1000 parts of water containing 1.5 parts of Triton X-100 (polyoxyethylated isooctylphenol) and 0.15 part of sodium lauryl sulphate, and finally, after emulsifying, one part of carboxymethylcellulose is added. After standing for 24 hours it is skimmed and distilled at normal pressure until heptane is removed and up to a concentration of 36% by weight of solid in the latex.

An aqueous solution having the following composition is prepared separately:

| | Parts by weight |
|---|---|
| Water | 100 |
| Resorcinol | 11 |
| Formaldehyde solution (at 35%) | 17 |
| Sodium hydroxide (at 30%) | 1 | and, after one hour of maturing, 83.3 g. of the prepared latex and 16.7 g. of water are added to said solution.

The admixture so obtained is then permitted to mature for varying time periods and is then used for the spreading of the square rayon fabric which, after drying, is made to adhere to a mix based on the copolymer having the composition shown in Example 1; it is vulcanized for 40 minutes at 165° C.

In Table 2 the data obtained by using the same method and the same conditions indicated in Example 1 are given.

TABLE 2

| Maturing time of resin-latex admixtures (days) | Adhesion in kg./cm. at— | |
|---|---|---|
| | 25° C. | 90° C. |
| 0 | 1.9 | |
| 1 | 3.3 | 1.8 |
| 2 | 6.5 | 3.5 |
| 3 | 8.2 | 5.6 |
| 4 | 8.4 | 6.0 |
| 6 | 7.5 | 6.4 |
| 8 | 8.0 | 5.1 |
| 10 | 7.5 | 4.0 |
| 13 | 7.3 | 4.4 |

Variations can, of course, be made without departing from the spirit of the invention.

Having described the invention what it is desired to secure and claim by Letters Patent is:

1. In a process for bonding a fiber selected from the group consisting of natural and synthetic fibers to a saturated, amorphous, elastomeric copolymer of ethylene with a higher alpha-olefin, said copolymer having an ethylene molar content of from about 20 to 80 mol percent, said process comprising coating said fiber with a phenol/formaldehyde resin and with a modified ethylene/higher alpha-olefin copolymer, drying the coated fiber, contacting the dried fiber with a vulvanizable composition comprising said saturated amorphous elastomeric copolymer and a vulcanizing agent of an organic peroxide and sulfur, and vulcanizing said vulcanizable composition while in contact with said coated fiber by heating at a temperature in the range of from about 100 to 230° C., the improvement which comprises employing as said phenol/formaldehyde resin an aqueous resorcinol/formaldehyde resin solution having a resorcinal/formaldehyde molar ratio in the range of from about 1.5:1 to 10:1, employing as said modified ethylene/higher alpha-olefin copolymer composition and aqueous latex consisting essentially of (1) water, (2) an ethylene/higher alpha-olefin copolymer having an ethylene content of from about 20 to 80 mol percent and having grafted thereon a member selected from the group consisting of maleic acid and maleic anhydride, said grafted copolymer containing from about 1 to 10% of maleic acid, and (3) a surface active agent consisting of a mixture of a nonionic surfactant and an anionic surfactant, said resin solution and said modified copolymer composition being applied to said fiber in a single coating from an aqueous dispersion thereof after said aqueous dispersion has been allowed to mature for about 40 to 120 hours after admixture of its ingredients.

2. The process of claim 1, wherein the copolymer used for the latex is selected from the group consisting of ethylene-propylene and ethylene-butene-1 copolymers, and the grafting has been carried out by heating to a temperature of from 150° to 200° C. in the presence of from 0.2 to 1.5% by weight of an organic peroxide.

3. The process of claim 2, wherein the aqueous latex containing the grafted ethylene-alpha-olefin copolymer and an admixture of a non-ionic surfactant and an anionic surfactant is obtained by emulsifying a hydrocarbon solution containing 1–30% by weight of the grafted copolymer with a solution, in the same volume of water, of an admixture of a non-ionic surfactant and of an anionic surfactant, and the emulsion thus obtained is freed from the hydrocarbon solvent in order to obtain the latex.

4. The process of claim 3, wherein a creaming agent is added to the emulsion in order to separate an enriched emulsion from the aqueous layer, which emulsion is then freed from the hydrocarbon solvent to obtain the latex.

5. The process of claim 4, wherein the creaming agent is a carboxymethylcellulose.

6. The process of claim 5, wherein the resin-latex dispersion contains from 15 to 50 parts by weight of the two surface-active agents per 100 parts of grafted copolymer.

7. The process of claim 6, wherein the non-ionic surface active agent is polyoxyethylated alkylphenol.

8. The process of claim 7, wherein the polyoxyethylated alkyl phenol is the condensation product of 6–10 mols of ethylene oxide with 1 mol of alkylphenol having an aliphatic chain containing from 6 to 10 carbon atoms.

9. The process of claim 8, wherein the polyoxyethylated alkylphenol is polyoxyethylated octylphenol.

10. The process of claim 6, wherein the non-ionic surface-active agent is selected from the group consisting of the polyoxyethylated alcohols having the general formula R(OCHR'CHR')$_n$OH in which R is alkyl, R' is hydrogen or alkyl and $n$ is a number between 4 and 10.

11. The process of claim 10, wherein the anionic surface-active agent is selected from the group consisting of sodium lauryl sulphate, the sodium salts of the sulfates of the polyoxyethylated phenols, sodium oleate, sodium palmitate, sodium stearate, potassium oleate, potassium palmitate, and potassium stearate.

12. The process of claim 1, wherein the non-modified ethylene-alpha-olefin copolymer to be adhered to the fiber, and the grafted one that is employed in the adhesive admixture are selected from the group consisting of ethylene-propylene and ethylene-butene-1 copolymers having a molecular weight between 60,000 and 800,000.

13. The process of claim 12, wherein the ethylene-alpha-olefin copolymer has a molecular weight of from 80,000 to 500,000.

14. The process of claim 13, wherein the fiber is rayon.

15. The process of claim 13, wherein the fiber is a polyamide.

16. The process of claim 13, wherein the fiber is cotton.

References Cited

UNITED STATES PATENTS

| | | |
|---|---|---|
| 2,211,951 | 8/1940 | Hershberger. |
| 2,854,357 | 9/1958 | Johnson et al. |
| 3,262,482 | 7/1966 | Clifton et al. |
| 3,284,278 | 11/1966 | Falcone et al. |

WILLIAM D. MARTIN, *Primary Examiner.*

R. HUSACK, *Assistant Examiner.*

U.S. Cl. X.R.

117—161, 138.8, 143, 145; 156—110

UNITED STATES PATENT OFFICE
CERTIFICATE OF CORRECTION

Patent No. 3,427,183
February 11, 1969

Augusto Portolani et al.

It is certified that error appears in the above identified patent and that said Letters Patent are hereby corrected as shown below:

Column 1, line 31, "relates a" should read -- relates to a --; line 38, "butene-1" should read -- butene-1, --. Column 2, line 27, "of latex" should read -- of a latex --; line 30, "therefore" should read -- thereof --; line 69, "(emulsifies)" should read -- (emulsifiers) --. Column 3, line 18, "maletic" should read -- maleic --; line 20, "agitation" should read -- agitation, --; line 33, "polyoxyethylated and alkylphenols" should read -- polyoxyethylated alkylphenols --; line 35, "of alkylphenol" should read -- of an alkylphenol --; line 72, "conventional member," should read -- conventional manner, --. Column 4, line 14, "etc.); preferably" should read -- etc.). Preferably --. Column 6, line 24, "vulvanizable" should read -- vulcanizable --; line 32, "having a resorcinal/" should read -- having a resorcinol/ --; line 35, "and aqueous" should read -- an aqueous --.

Signed and sealed this 24th day of March 1970.

(SEAL)
Attest:

EDWARD M. FLETCHER, JR.
Attesting Officer

WILLIAM E. SCHUYLER, JR.
Commissioner of Patents